United States Patent

Von Lowis OF Menar

[11] 3,722,960
[45] Mar. 27, 1973

[54] BRAKING SYSTEM FOR AUTOMOTIVE VEHICLES WITH MEANS FOR PREVENTING THE LOCKING OF WHEELS DURING BRAKING

[75] Inventor: Alexander Von Lowis OF Menar, Mauren, Germany

[73] Assignee: Robert Bosch GmbH, Stuttgart, Germany

[22] Filed: Aug. 27, 1970

[21] Appl. No.: 67,416

[30] Foreign Application Priority Data

Sept. 17, 1969 Germany..................P 19 47 012.3

[52] U.S. Cl...............................303/21 AF, 303/21 F
[51] Int. Cl....................................B60t 8/00
[58] Field of Search.........188/181, 345; 303/6 C, 10, 303/21 AF, 21 F, 24

[56] References Cited

UNITED STATES PATENTS

| 3,153,559 | 10/1964 | Schaffer | 303/21 F |
| 3,544,171 | 12/1970 | Lester et al. | 303/21 F |
| 3,556,615 | 1/1971 | Stelzer | 303/21 F |
| 3,610,702 | 10/1971 | MacDuff | 303/21 F |

Primary Examiner—Milton Buchler
Assistant Examiner—Stephen G. Kunin
Attorney—Michael S. Striker

[57] ABSTRACT

A braking system for the wheels of an automotive vehicle wherein the master cylinder is connected with the wheel cylinders by brake lines and can supply to the wheel cylinders a braking medium under such pressure that the wheels are locked and skid along the road surface. The braking system further includes devices which prevent prolonged locking of wheels in response to excessive pressurization of the braking medium, and each such device includes a shutoff valve which is provided in the respective brake line, a control piston which normally holds the shutoff valve in open position under the action of a pressurized fluid, and a safety plunger which is normally retracted to stress a spring and is displaced by such spring in response to a predetermined drop in the fluid pressure whereby the plunger maintains the shutoff valve in open position by way of the control piston. The latter permits the shutoff valve to close when a sensor detects that the corresponding wheel is locked in response to excessive pressure of braking medium in the wheel cylinder; at the same time, the control piston increases the volume of a cylinder chamber which receives some braking medium to thus effect a reduction of pressure in the wheel cylinder and the termination of locking action.

12 Claims, 4 Drawing Figures

BRAKING SYSTEM FOR AUTOMOTIVE VEHICLES WITH MEANS FOR PREVENTING THE LOCKING OF WHEELS DURING BRAKING

BACKGROUND OF THE INVENTION

The present invention relates to improvements in devices for preventing prolonged locking of wheels in automotive vehicles in response to the application of a braking force. More particularly, the invention relates to improvements in so-called antilock devices of the type disclosed in German printed publication Ser. No. 1,287,459.

Known antilock devices are normally installed in the brake lines between the master cylinder and the wheel cylinders of the braking system in an automotive vehicle. The antilock device of the aforementioned publication employs a very strong spring which biases a valve member in the brake line between the master cylinder and the prespective wheel cylinder to maintain the valve member in an open position, irrespective of the pressure of braking medium in the brake line, as long as the associated wheel is free to roll. The spring is mounted in such a way that it can maintain the valve member in open position while it stores a minimum amount of energy. Thus, if the spring is a helical compression spring, it must be capable of holding the valve member in open position while its length reaches a maximum value. When a wheel is locked during braking, the spring must perform as many as 10 strokes per second so that it is subjected to extremely high dynamic stresses. The same applies for the control pistons of such known antilock devices; the control piston must perform as many strokes as the spring so that the wear on its seals is quite extensive. This necessitates frequent inspection and replacement of the seals.

SUMMARY OF THE INVENTION

An object of the invention is to provide a braking system for the wheels of automotive vehicles wherein each braked wheel is associated with a novel and improved device which is capable of effectively preventing prolonged locking of the wheel and whose parts can stand extended periods of use without undue wear and without being subjected to excessive dynamic and/or other stresses.

Another object of the invention is to provide a novel antilock device which is automatically prevented from influencing the braking operation when one or more of its parts fail to operate properly or undergo partial or complete destruction.

A further object of the invention is to provide an antilock device which can be installed in existing braking systems for the wheels of automotive vehicles.

An additional object of the invention is to provide an antilock device which occupies little room, which automatically effects a reduction in the pressure of braking medium in the associated wheel cylinder of the braking system when such pressure causes a locking of the wheel, and which enables the driver of the vehicle to produce an optimum braking action by automatically reducing the pressure of braking medium in the wheel cylinder when such pressure exceeds the pressure at which the wheel is braked with a force that is just below the force required to lock the wheel.

Still another object of the invention is to provide a novel safety structure for use in the antilock device of the above outlined character.

The invention is embodied in a braking system for the wheels of automotive vehicles which comprises a wheel cylinder for each braked wheel, means including a master cylinder and brake lines connecting the master cylinder with the wheel cylinders to supply to each wheel cylinder a braking medium (normally a liquid) at a pressure which suffices to cause locking of the corresponding wheel, and a novel antilock device for each wheel cylinder and each arranged to prevent prolonged locking of the associated wheel. Each antilock device comprises a shutoff valve in the respective brake line, a control piston which normally assumes an operative position in which it opens the shutoff valve and one end of which is subjected to the pressure of medium in the brake line whereby such medium tends to move the control piston to an inoperative position in which the shutoff valve is closed, with attendant reduction in the pressure of braking medium in the wheel cylinder, a source of pressurized fluid, a safety plunger movable between a first position in which it permits the control piston to assume its inoperative position and a second position in which the plunger maintains the piston in operative position to prevent closing of the shutoff valve, resilient means for constantly biasing the plunger to its second position, and cylinder means provided for the plunger and being connected with the source of pressurized fluid so that the fluid normally maintains the plunger in the first position as long as the fluid pressure exceeds a predetermined value. Such pressure drops below the predetermined value in response to a leak in the conduitry of the antilock device and/or in response to failure to the means for pressurizing the fluid. The control piston permits the shutoff valve to close when a sensor detects that the corresponding wheel is locked in response to excessive pressure of braking medium in the wheel cylinder.

The novel features which are considered as characteristic of the invention are set forth in particular in the appended claims. The improved antilock device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2:
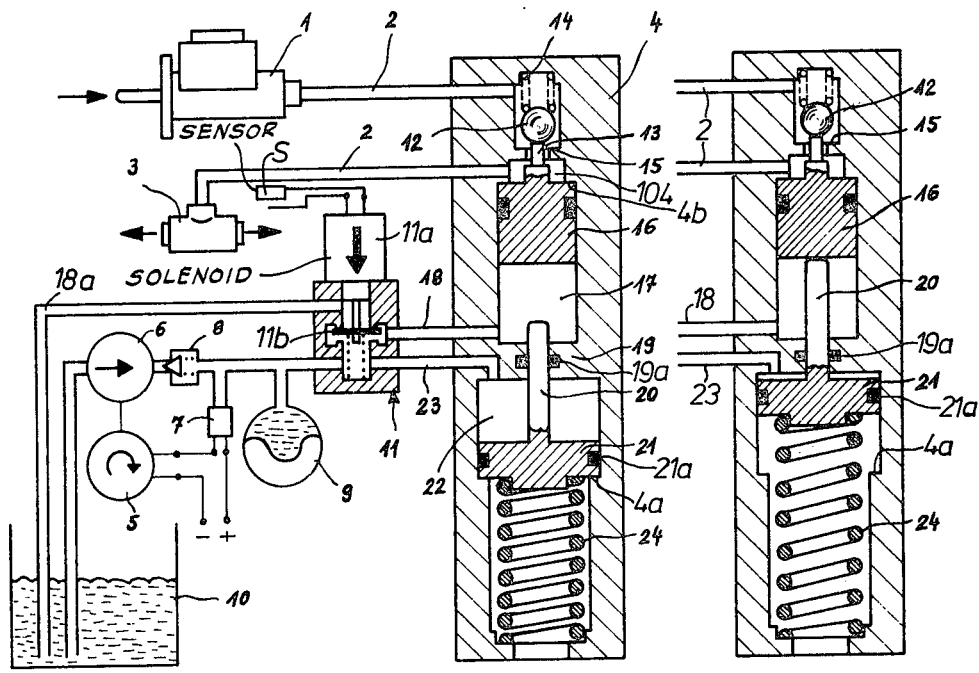
FIG. 1 is a diagrammatic partly sectional and partly elevational view of a portion of a hydraulic braking system for automotive vehicles embodying an antilock device which is constructed in accordance with a first embodiment of the invention.
FIG. 2 illustrates certain parts of the antilock device in positions they assume when the antilock device fails to operate in the required manner.

FIG. 1 illustrates the master cylinder 1 and one wheel cylinder 3 of a hydraulic braking system for automotive vehicles. The cylinders 1 and 3 are connected to each other by a brake line 2 which contains a valve housing 4 forming part of an automatic antilock device serving to prevent skidding and locking of the wheel (not shown) which is associated with the cylinder 3. The antilock device further comprises an electric motor 5 which drives a pump 6 installed in a supply conduit 23 which draws hydraulic fluid (e.g., oil) from a tank 10. The supply conduit 23 further contains a one-way valve 8 which is installed downstream of the pump 6 and prevents reflux of oil into the tank 10 by way of the pump. A pressure accumulator 9 is connected with the supply conduit 23 between the one-way valve 8 and a solenoid-operated regulating valve 11. A pressure-responsive electric switch 7 monitors the oil pressure in the supply conduit 23 downstream of the one-way valve 8. The oil pressure in the supply conduit 23 must at least equal but normally exceeds the maximum pressure of braking medium in the brake line 2.

The housing 4 contains a normally open shutoff valve which includes a spherical valve member 12 and a valve spring 14 which urges the valve member against an annular seat 15 in the housing. The valve member 12 is normally lifted off the seat 15 by the projection 13 of a control piston 16 which is reciprocable in a cylinder chamber 17 of the housing 4. When the shutoff valve is open, the piston of the master cylinder 1 can force pressurized braking medium through the brake line 2 and into the wheel cylinder 3 to produce a requisite braking force. The control piston 16 is held in the position shown in FIG. 1 by pressurized hydraulic fluid which is admitted to the cylinder chamber 17 by a connecting conduit 18. The latter can communicate with the supply conduit 23 when the valve member 11b of the regulating valve 11 assumes the position shown in FIG. 1. Thus, the oil pressure in the chamber 17 then equals the oil pressure in the supply conduit 23, and such pressure should at least equal the maximum pressure of braking medium in the brake line 2.

That end of the chamber 17 which is remote from the seat 15 is closed by a transverse partition 19 which forms part of the housing 4 and is provided with a central passage for the piston rod or stem 20 of a safety plunger 21 reciprocable in a second cylinder chamber 22 of the housing 4. The safety plunger 21 is biased upwardly, as viewed in FIG. 1, by a strong resilient element here shown as a helical spring 24. The supply conduit 23 communicates with the chamber 22 so that the oil pressure in the chamber 22 opposes the action of the spring 24 which tends to move the stem 20 deeper into the chamber 17. The supply conduit 23 is not influenced by changes in the position of the valve member 11b in the regulating valve 11, i.e., the pressure of oil in the supply conduit 23 is only a function of pressure in the accumulator 9 and at the outlet of the pump 6.

The solenoid 11a for the regulating valve 11 is installed in an electric circuit which is normally open and closes when a detector or sensor S detects that the wheel associated with the cylinder 3 is locked, i.e., that such wheel skids along the road surface. The sensor S can be said to constitute or include a normally open electric switch which is in circuit with the solenoid 11a and closes as soon as the respective wheel of the vehicle ceases to rotate. Such switch is always open when the wheel rolls along the road surface.

The operation:

When the antilock device is operative, the safety plunger 21 is held in its lower or retracted position in which it abuts against an internal shoulder 4a of the housing 4. This is due to the fact that the pressure of oil in the cylinder chamber 22 normally suffices to overcome the bias of the spring 24 and to maintain the safety plunger 21 in the fully retracted position. The valve member 11b of the regulating valve 11 is held in the position shown in FIG. 1 so that the connecting conduit 18 communicates with the supply conduit 23 and the oil pressure in the cylinder chamber 17 suffices to enable the control piston 16 to hold the valve member 12 of the shutoff valve away from its seat 15.

If the operator of the vehicle decides to apply the brakes, the pedal (not shown) is depressed in the direction indicated by the arrow whereby the piston of the master cylinder 1 forces the braking medium through the brake line 2 and into the wheel cylinder 3 to produce a desirable braking action. The projection 13 of the control piston 16 normally maintains the valve member 12 at such a distance from the seat 15 that the valve member does not obstruct the flow of oil from the master cylinder 1 into the wheel cylinder 3. The chamber 104 at the upper end of the control piston 16 is filled with the braking medium which urges the control piston downwardly.

If the thus braked wheel is locked and begins to skid, the sensor S immediately completes the circuit of the solenoid 11a which changes the position of the valve member 11b in the regulating valve 11 so that the connecting conduit 18 is sealed from the supply conduit 23. At the same time, the connecting conduit 18 is connected with a return conduit 18a which permits oil to flow from the cylinder chamber 17 into the tank 10. Thus, the spring 14 is free to move the valve member 12 against the seat 15 and thus prevents introduction of additional pressurized oil into the wheel cylinder 3. Furthermore, the braking medium (e.g., oil) can flow from the wheel cylinder 3 into the chamber 104 above the control piston 16 to thus reduce the pressure of braking medium in the cylinder 3 with a resulting reduction in the braking force. Consequently, the wheel is unlocked and ceases to skid along the road surface. This causes the sensor S to open the circuit of the solenoid 11a so that the valve member 11b reassumes the illustrated position and seals the return conduit 18a from the connecting conduit 18. The latter is free to communicate with the supply conduit 23, the pressure in the chamber 17 rises and the control piston 16 reassumes the illustrated position whereby the projection 13 lifts the valve member 12 off the seat 15. Thus, the driver is again free to increase the braking force by pumping pressurized braking medium from the master cylinder 1, through the brake line 2 and into the wheel cylinder 3. The position of the safety plunger 21 remains unchanged, i.e., this plunger continues to abut against the shoulder 4a and to stress the spring 24 as long as the oil pressure in the supply conduit 23 and cylinder chamber 22 exceeds a predetermined value, namely, a value which at least equals the maximum pressure of braking medium in the brake line 2. Since the plunger 21 is normally at a standstill, its ring seal 21a and the seal 19a for the stem 20 in the partition 19 are subjected to negligible wear so that such parts can stand extended periods of use.

If the antilock device becomes defective, for example, due to improper operation of the pump 6 and/or motor 5, or if the supply conduit 23 develops a leak, the oil pressure in the chamber 22 drops and the spring 24 is free to expand so as to push the safety plunger 21 toward the partition 19. The stem 20 penetrates into the chamber 17 and engages the underside of the control piston 16 so that the latter continues to bear against an internal shoulder 4b of the housing 4 and maintains the valve member 12 of the shutoff valve in open position. This insures that the valve member 12 cannot block the flow of braking medium from the master cylinder 1 into the wheel cylinder 3, i.e., that the driver can apply the brakes despite the fact that the antilock device happens to be defective. The just described extreme position of the safety plunger 21 and its stem 20 is shown in FIG. 2. The exact construction of the sensor S forms no part of the present invention.

Figures 3, 4:
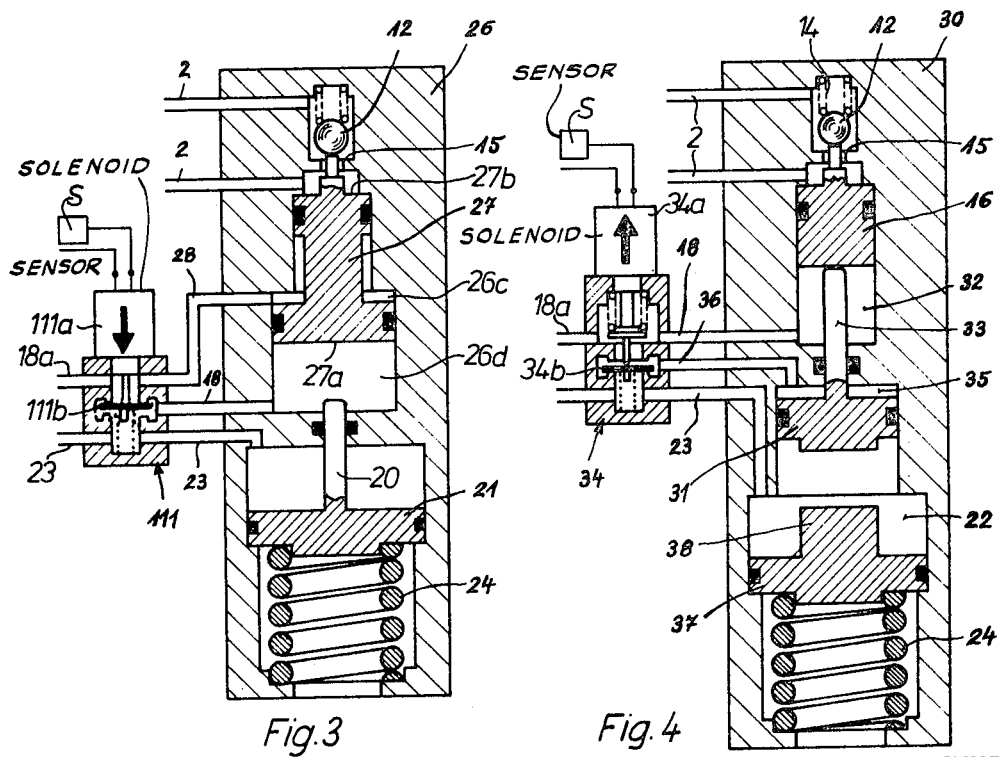
FIG. 3 is a fragmentary sectional view of a second braking system having a modified antilock device.
FIG. 4 is a fragmentary sectional view of a third braking system which embodies a further antilock device.

FIG. 3 illustrates a solenoid-operated regulating valve 111 and the valve housing 26 of a modified antilock device. The brake line 2 can deliver a pressurized braking medium from the master cylinder (not shown) to the corresponding wheel cylinder (not shown) when the valve member 12 of the shutoff valve is held in open position by the projection of a two-stage control piston 27. That part of the housing 26 which defines two cylinder chambers 26c, 26d at the opposite ends of the control piston 27 constitutes a double-acting cylinder. The chamber 26d corresponds to the chamber 17 of FIG. 1 and is normally connected with the supply conduit 23 by way of the connecting conduit 18. A further conduit 28 connects the cylinder chamber 26c with the return conduit 18a when the valve member 111b assumes the illustrated position, i.e., when the sensor S is inoperative and maintains the circuit of the solenoid 111a in open position. When the solenoid 111a is energized because the sensor S detects that the corresponding wheel is locked and skids along the road surface, the conduit 28 to the chamber 26c remains connected with the return conduit 18a but the latter is also connected with the conduit 18. Thus, one stage of the control piston 27 is always subjected to normal atmospheric pressure.

An advantage of the antilock device which includes the parts shown in FIG. 3 is that the oil pressure produced by its pump (not shown) need not exceed and can be less than the maximum pressure of braking medium in the brake line 2. The area of the surface 27a at the underside of the control piston 27 is much larger than the area of the surface 27b which is subjected to the pressure of braking medium in the brake line 2; therefore, a relatively low oil pressure in the supply conduit 23 and chamber 26d suffices to maintain the valve member 12 of the shutoff valve in open position. When the antilock device fails to operate properly, i.e., when the oil pressure in the chamber 22 of the valve housing 26 drops below a predetermined value, the spring 24 expands and the stem 20 of the safety plunger 21 is caused to bear against the surface 27a to maintain the control piston 27 in its upper end position so that the valve member 12 of the shutoff valve is lifted off the seat 15.

FIG. 4 illustrates a portion of a third antilock device. The valve housing 30 contains a shutoff valve including a spherical valve member 12, a seat 15 and a valve spring 14. The shutoff valve normally permits the flow of a braking medium from the master cylinder (not shown), by way of the brake line 2 and into the corresponding wheel cylinder (not shown). The valve member 12 is normally lifted off its seat 15 by the projection of a control piston 16 which is reciprocable in a cylinder chamber 32. The latter is permanently connected with the return conduit 18a by way of the connecting conduit 18. The safety plunger 21 of FIGS. 1–3 is replaced with a modified safety plunger 37 which does not have a pronounced stem (20 in FIGS. 1–3) but rather a relatively short boss or hub 38 which can engage the underside of an intermediate piston 31. The cylinder chamber 22 is connected with the supply conduit 23 so that oil in the chamber 22 normally urges the safety plunger 37 against an internal shoulder of the valve housing 30 to stress the spring 24 and that the piston rod or stem 33 of the intermediate piston 31 bears against the control piston 16 whereby the latter's projection lifts the valve member 12 off the seat 15. A cylinder chamber 35 above the intermediate piston 31 is normally connected with the return line 18a by way of a further conduit 36. Thus, oil in the cylinder chambers 32 and 35 is normally maintained at atmospheric pressure.

The regulating valve 34 is operated by a solenoid 34a which is in circuit with the sensor S. The valve member 34b of this valve normally connects the return conduit 18a with the conduits 18 and 36 and invariably connects the supply conduit 23 and chamber 22 with the pressure side of the pump (not shown) of the antilock device. When the sensor S detects that the corresponding wheel is locked, i.e., that the wheel skids along the road surface, the valve member 34b connects 36 with the supply conduit 23.

The operation of the antilock device which embodies the structure of FIG. 4 is as follows:

When the antilock device is operative and the sensor S detects that the corresponding wheel is locked, the valve member 34b of the regulating valve 34 connects the supply conduit 23 with the conduit 36 so that the pressure of oil in the chamber 35 rises and the intermediate piston 31 moves downwardly under the action of the spring 14 and the pressure of braking medium in the brake line 2. The spring 14 is assisted by such pressure of braking medium in the brake line 2 and moves the valve member 12 against the seat 15 whereby the wheel cylinder is sealed from the master cylinder. The spring 14 can effect such movement of the valve member 12 because, when the supply conduit 23 is connected with the conduit 36, the oil pressure in the chamber 35 equals the oil pressure in the chamber 22 so that the pressures at the opposite ends of the intermediate piston 31 are substantially identical. Consequently, the spring 14, assisted by the pressure of braking medium in the brake line 2, can readily cause the valve member 12 to push the stem 33 downwardly and to shift the intermeidiate piston 31 until the valve member 12 reaches the seat 15. When the sensor S detects that the corresponding wheel is free to rotate, the solenoid 34a is deenergized and the valve member 34b reassumes the illustrated position so that the conduit 36 is sealed from the supply conduit 23 and communicates with the return conduit 18a. The oil pressure in the chamber 35 drops but the oil pressure in the chamber 22 remains unchanged so that the stem 33 lifts the valve member 12 off the seat 15.

If the oil pressure in the chamber 22 drops below a predetermined minimum value which is indicative of improper operation of or damage to the antilock device, the spring 24 expands and moves the boss 38 of the safety plunger 37 against the intermediate piston 31. The latter is then held in the illustrated upper end position and prevents movement of the valve member 12 against the seat 15. Thus, when it fails to operate properly, the antilock device cannot prevent the flow of braking medium from the master cylinder into the wheel cylinder.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claim.

What is claimed as new and desired to be protected by Letters Patent is set forth in the appended;

1. In a braking system for the wheels of automotive vehicles, a combination comprising a wheel cylinder; means including a brake line for supplying to said cylinder a braking medium at a pressure which suffices to cause locking of the corresponding wheel; and a device for preventing prolonged locking of the wheel, said device comprising a shutoff valve in said brake line, a control piston normally assuming an operative position in which said piston opens said valve, one end of said piston being subjected to the pressure of braking medium in said line whereby the braking medium tends to move said piston to an inoperative position in which the piston permits said valve to close with attendant reduction of the pressure of braking medium in said cylinder, a source of pressurized fluid, a safety plunger movable between a first position in which said plunger permits said piston to assume said inoperative position and a second position in which said plunger maintains said piston in said operative position, means for constantly biasing said plunger to said second position, cylinder means provided for said plunger and permanently connected with said source so that the pressurized fluid normally maintains said plunger in said first position as long as the pressure of said fluid exceeds a predetermined minimum value, means for connecting the other end of said piston with said source so that the other end of said piston is subjected to fluid pressure which at least approximates the pressure of fluid action upon said plunger, and regulating valve means actuatable to seal off said source from said other end of said piston in response to locking of the corresponding wheel whereby the pressure of braking medium acting against said one end of said piston suffices to move said piston to said inoperative position.

2. A combination as defined in claim 1, wherein said control piston is a multi-stage piston one stage of which is subjected to atmospheric pressure.

3. A combination as defined in claim 1, further comprising an intermediate piston interposed between said control piston and said safety plunger to move said control piston to operative position in response to movement of said plunger to said second position.

4. A combination as defined in claim 3, wherein said regulating valve means is arranged to admit pressurized fluid from said source against one end of said intermediate piston in response to locking of the wheel which is associated with said wheel cylinder whereby such fluid tends to move said intermediate piston in a direction to permit closing of said shutoff valve.

5. A combination as defined in claim 4, wherein said one end of said intermediate piston is normally subjected to atmospheric pressure.

6. A combination as defined in claim 1, wherein said fluid is a hydraulic fluid and said source comprises pump means and supply conduit means connecting said pump means with said cylinder means.

7. A combination as defined in claim 1, wherein said biasing means comprises a helical spring which is normally maintained by said control plunger in fully stressed condition.

8. A combination as defined in claim 1, wherein said source comprises a supply conduit connected with said cylinder means and further comprising detector means responsive to locking of the wheel which is associated with said wheel cylinder to actuate said regulating valve means.

9. A combination as defined in claim 1, wherein said cylinder means constitutes a housing for said shutoff valve, said control piston, said safety plunger and said biasing means.

10. A combination as defined in claim 1, wherein the normal pressure of said fluid at least equals the maximum pressure of braking medium in said brake line.

11. A combination as defined in claim 1, wherein the normal pressure of said fluid is less than the maximum pressure of braking medium in said brake line.

12. A combination as defined in claim 1, wherein said cylinder means comprises a first chamber adjacent to said other end of said piston, a second chamber, and an apertured partition between said first and second chambers, said plunger being reciprocable in said second chamber and having a piston rod sealingly extending through the aperture of said partition, said piston rod being spaced apart from said piston in the first position of said plunger and engaging said piston in the second position of said plunger, said source comprising a supply conduit and a return conduit, said regulating valve means being installed in said supply conduit and having a valve member normally assuming a first position in which said supply is connected with said first and second chambers to maintain said piston in said operative position and to simultaneously maintain said plunger in said first position, said valve member being movable to a second position in which said second chamber remains connected to said supply conduit and the first chamber is connected with said return conduit so that, when the fluid pressure in said supply conduit drops below said minimum value, said plunger assumes said second position under the action of said biasing means, said device further comprising detector means cooperating with said regulating valve means to move said valve member to said second position in response to locking of the corresponding wheel.

* * * * *